United States Patent [19]

Wakabayashi

[11] Patent Number: 4,721,972
[45] Date of Patent: Jan. 26, 1988

[54] CAMERA HAVING A PHOTO-TAKING LENS BARREL MOVABLE IN THE DIRECTION OF THE OPTIC AXIS

[75] Inventor: Hiroshi Wakabayashi, Yokohama, Japan

[73] Assignee: Nippon Kogaku K. K., Tokyo, Japan

[21] Appl. No.: 865,386

[22] Filed: May 21, 1986

[30] Foreign Application Priority Data

May 25, 1985 [JP] Japan .................................. 60-112752

[51] Int. Cl.⁴ ......................... G03B 3/10; G03B 17/00; G03B 9/24
[52] U.S. Cl. ............................... 354/195.1; 354/234.1; 354/288
[58] Field of Search .................... 354/230, 233, 234.1, 354/235.1, 288

[56] References Cited

U.S. PATENT DOCUMENTS

| | | | |
|---|---|---|---|
| 993,047 | 5/1911 | Folmer | 354/288 X |
| 3,654,845 | 4/1972 | Fahlenberg et al. | 354/234.1 |
| 4,227,792 | 10/1980 | Rentschler | 354/234.1 X |
| 4,410,253 | 10/1983 | Tsuboi | 354/195.1 |
| 4,525,050 | 6/1985 | Ohashi | 354/195.12 |

Primary Examiner—Donald A. Griffin
Attorney, Agent, or Firm—Shapiro and Shapiro

[57] ABSTRACT

In a camera having a photo-taking lens barrel displaceable in the direction of the optic axis, the lens barrel includes a photo-taking optical system, a lens barrier blade disposed forwardly of the optical system and movable in a plane orthogonal to the optic axis of the optical system between a closed position for covering the front of the optical system and an opened position for exposing the front of the optical system, a shutter blade serving also as a diaphragm, the shutter blade being disposed rearwardly of the optical system and opened and closed to expose a film to light, an outer shell surrounding the optical system, the barrier blade and the shutter blade, and a shutter blade driving device disposed in a space rearward of the barrier blade when in the opened position and surrounding the optical system, the driving device driving the shutter blade.

12 Claims, 13 Drawing Figures

CAMERA HAVING A PHOTO-TAKING LENS BARREL MOVABLE IN THE DIRECTION OF THE OPTIC AXIS

BACKGROUND OF THE INVENTION

1. Field of the Invention

This invention relates to a camera in which the entire photo-taking lens barrel is displaceable in the direction of the optic axis.

2. Related Background Art

Various cameras in which the entire photo-taking lens barrel is displaceable in the direction of the optic axis are known and recently, a two-focus camera has attracted attention. In this camera, a phototaking optical system is comprised of a main optical system and a sub optical system, and when the main optical system is moved forwardly, the sub lens is inserted onto the optic axis rearward of the main optical system, whereby the focal length can be changed. Such camera is known from patent publications such as Japanese Laid-Open Patent Applications No. 76919/1977, 33027/1979 and 202431/1983. However, in these publications, no mention is made of a shutter blade for controlling the exposure of a film. Japanese Laid-Open Patent Application No. 19926/1984 may be mentioned as a publication which proposes a shutter blade in a two-focus camera. In the two-focus camera provided with this shutter blade, a moving mechanism for focusing is provided around a main optical system. A shutter blade driving mechanism and a shutter blade serving also as a diaphragm are provided immediately rearwardly of the main optical system, and further, a sub optical system is inserted rearwardly of the shutter blade serving also as a diaphragm. Thus the structure of the shutter blade driving mechanism is very complicated and assembling work requires a long time and experience. Also, an outer shell surrounding the main optical system, the shutter blade and the shutter blade driving mechanism is formed into a square shell so as to also surround the lens frame of the sub optical system which is in a retracted position outside the optic axis. This has led to the creation of a useless space therein and moreover, there has been a disadvantage that the outside of the outer shell must be further covered with a square shell cover to make the space between the outer shell and the camera body light-tight. In the known cameras including the Japanese Laid-Open Patent Application No. 19926/1984, no consideration is given to a lens barrier blade for protecting the main optical system.

SUMMARY OF THE INVENTION

It is an object of the present invention to overcome the above-noted disadvantages peculiar to the prior art and to provide a camera in which a lens barrier blade and a shutter blade driving portion are contained in a photo-taking lens barrel movable in the direction of the optic axis and which is compact and easily assembled and operated.

DESCRIPTION OF THE PREFERRED EMBODIMENT

An embodiment of the present invention will hereinafter be described in detail with reference to the drawings.

Figure 1:
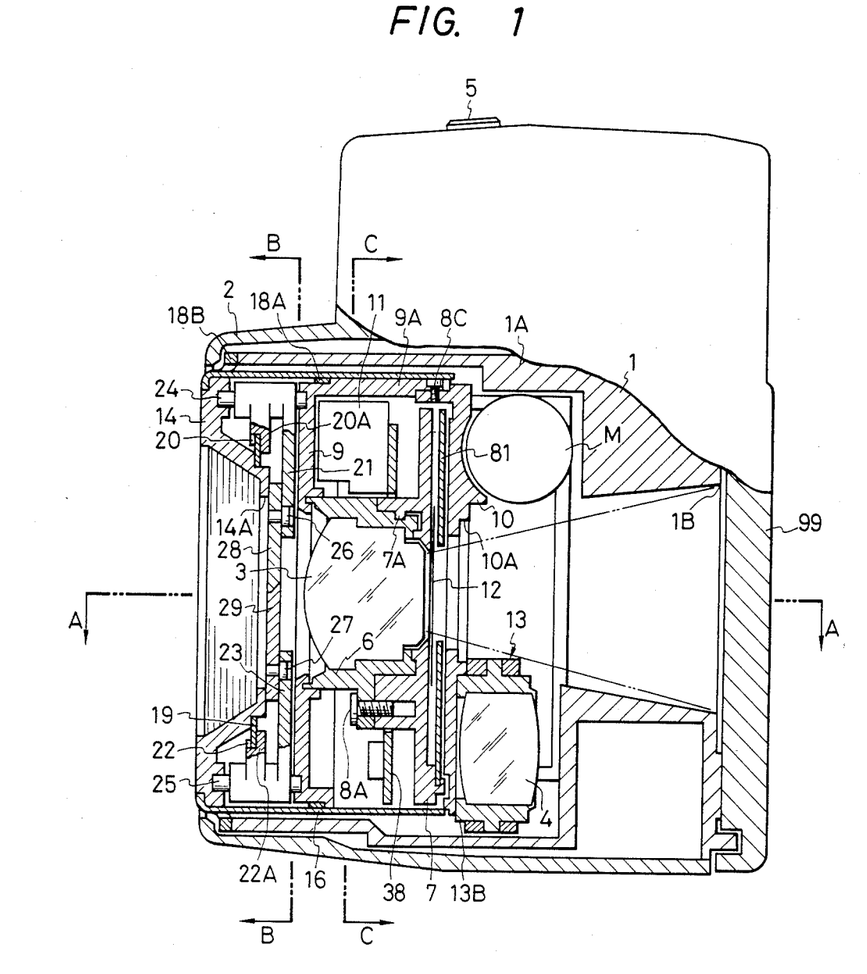
FIGS. 1 and 2 are cross-sectional view of an embodiment of the present invention, FIG. 1 showing a state in which a main optical system has been moved inwardly to a contained position, and FIG. 2 showing a state in which the main optical system has been moved outwardly to a telephoto position.
Figure 2:
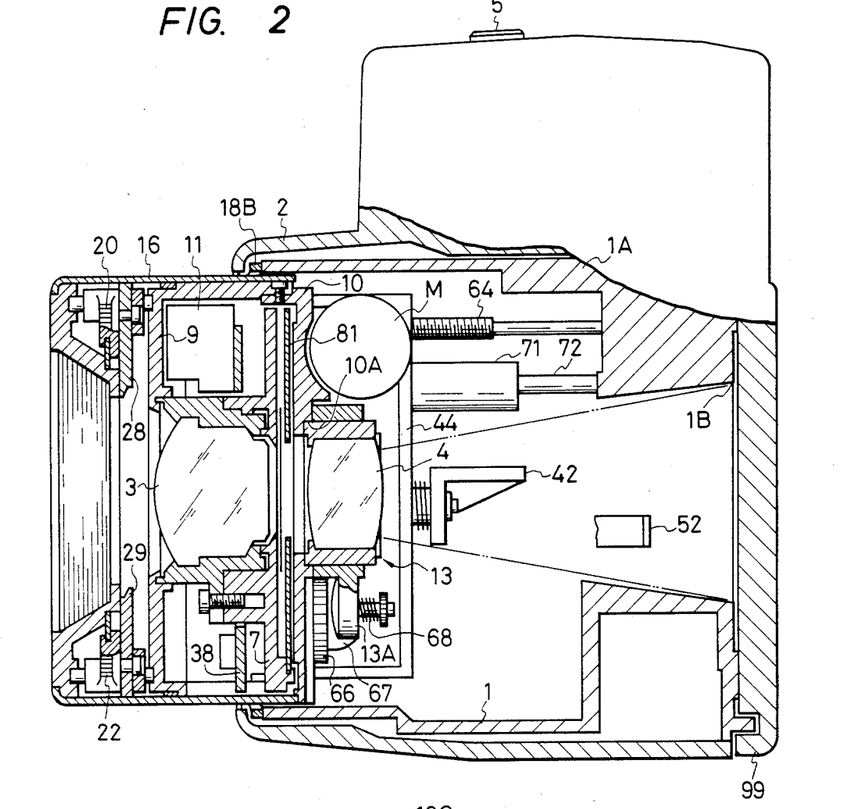
Figure 7:
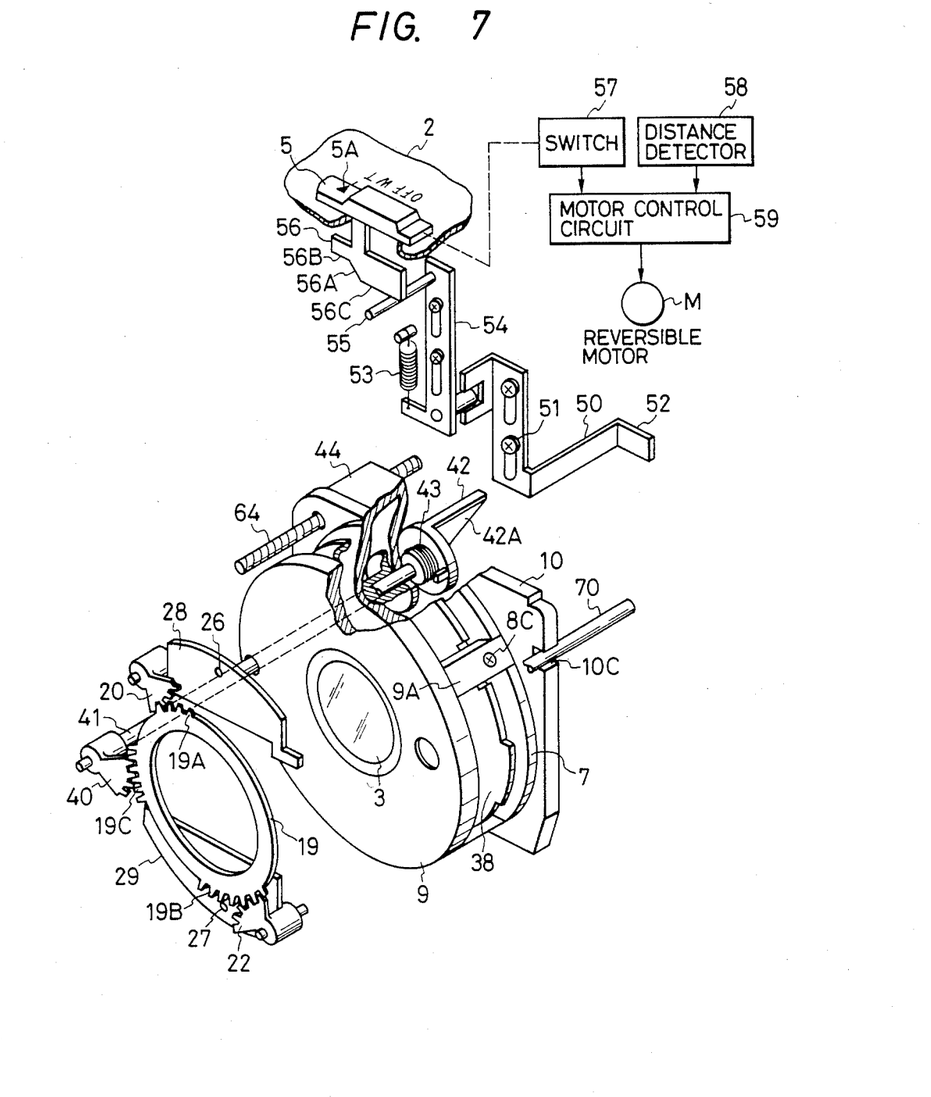
FIG. 7 is a perspective view showing the construction of a lens barrier blade opening-closing device shown in FIG. 1.

Referring to FIGS. 1 and 2, a camera body 1 is covered with an outer case 2, and a distance detecting device including a light projecting lens and a light receiving lens, not shown, a nder optical system, etc. are provided in the upper portion 1A of the camera body 1. Lens barrier blades 28 and 29 which will later be described in detail are openably-closably provided in front of the main optical system 3 of a photo-taking lens, and a sub optical system 4 is removably provided on the photo-taking optic axis rearwardly of the main optical system 3. Also, a focal length selecting member 5 operated to change the focal length of the photo-taking lens and open or close the lens barrier blades 28 and 29 is slidably provided on the upper surface of the outer cover 2. This focal length selecting member 5 has an index mark 5A, as shown in FIG. 7, and when the index mark 5A registers with a symbol "OFF" provided on the upper surface of the outer case 2, the lens barrier blades 28 and 29 are opened, and when the index mark 5A registers with a wide angle symbol "W", the lens barrier blades 28 and 29 are opened and there is brought about a short focal length state (hereinafter referred to as the "wide angle state") in which photography is possible by only the main optical system 3. Also, when the index mark 5A registers with a telephoto symbol "T", an optical system moving mechanism which will later be described in detail operates and the main optical system 3 is moved forwardly and concurrently, the sub optical system 4 is inserted rearwardly of the main optical system 3, and there is brought about a long combined focal length state (hereinafter referred to as the "telephoto state") by the main optical system 3 and the sub optical system 4. A switch device 57 for supplying a focal length change-over signal to a control circuit for controlling a reversible motor M which is a drive source for the movement of the main optical system 3 in the direction of the optic axis and the displacement of the sub optical system 4 in a direction perpendicular to the optic axis is operatively associated with the focal length selecting member 5 (see FIG. 7).

Figure 6:
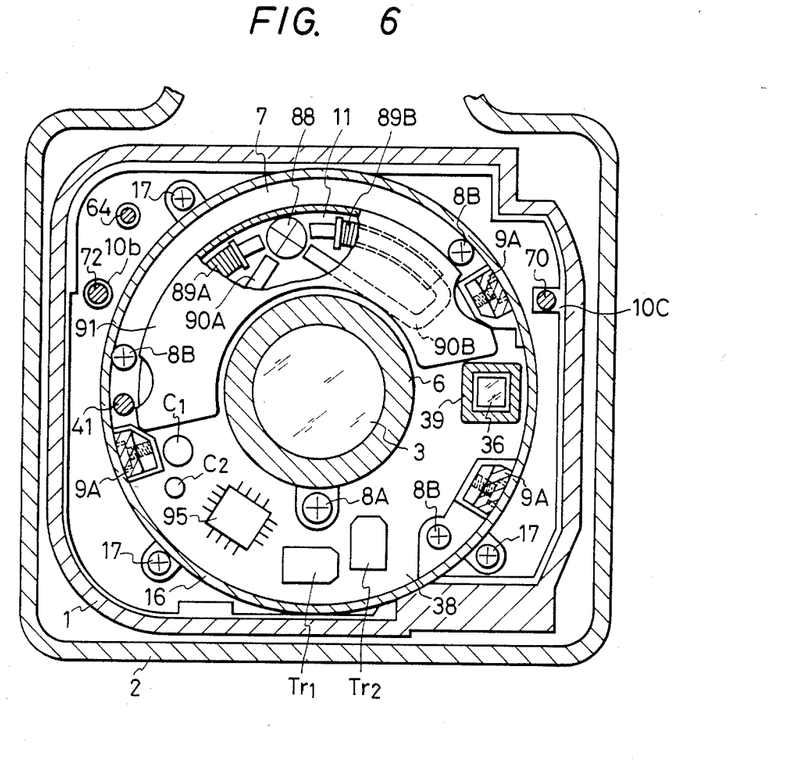
FIG. 6 is a cross-sectional view taken along line C—C of FIG. 1.

A main lens frame 6 for holding the main optical system 3 is secured to a shutter blade base plate 7 by means of a bayonet 7A and a small screw 8A. The shutter blade base plate 7 is fixed to a bed plate 10 by means of three small screws 8B, as shown in FIG. 6, and a barrier blade base plate 9 (see FIG. 1) for supporting a lens barrier device which will later be described in detail is fixed to the bed plate 10 by a small screw 8C through three projected legs 9A. A shutter blade 12 also serving as a diaphragm driven by a step motor 11 is provided between the bed plate 10 and the shutter blade base plate 7. Further, an optical system driving device (see FIG. 8) to be described which is driven by the reversible motor M is provided on the back of the bed plate 10, and the optical system moving mechanism is designed so as to move the bed plate 10 along the optic axis and further displace a sub optical system holder 13 for supporting the sub optical system 4 in a direction orthogonal to the optic axis.

Figure 3:
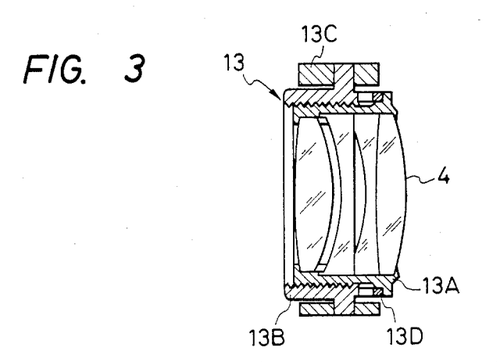
FIG. 3 is an enlarged cross-sectional view of a sub lens holder in the embodiment of FIG. 1.

The sub optical system holder 13, as shown in FIG. 3 is comprised of a sub lens frame 13A for holding the sub optical system 4, an inner frame shell 13B threadably engaged with the sub lens frame 13A, an outer frame 13C for supporting the inner frame shell 13B, and a compression spring 13D provided between the flange portion of the sub lens frame 13A and the inner frame shell 13B. The sub lens frame 13A is threadably engaged with the inner frame shell 13 and therefore, when the sub optical system 4 is inserted with the optic axis thereof being coincident with the optic axis of the main optical system 3 as shown in FIG. 2, the spacing between the two optical systems 3 and 4 can be adjusted by rotating the sub lens frame 13A against the biasing force of the compression spring 13D, whereby it becomes possible to readily set the combined focal length to a predetermined value.

A forward ring 14 is provided in front of the barrier blade base plate 9 fixed to the bed plate 10, and is supported by two struts 15A and 15B (see FIG. 5) studded in the barrier blade base plate 9. One end of an outer shell 16 covering the barrier blade base plate 9 and the outer periphery of the forward ring 14 is secured to the bed plate 10 by means of a small screw 17 as shown in FIG. 6, and the other end of the outer shell 16 is fitted to the forward ring 14 as shown in FIG. 1. A black soft packing 18A is provided between the barrier blade base plate 9 and the outer shell 16, and the outer periphery of the outer shell 16 is light-tightly sealed by a dual light-intercepting member 18B provided at the forward end of the camera body 1. The forward ring 14, together with the barrier blade base plate 9, constitutes a forward base plate for supporting the lens barrier device. A lens barrel opening 14A provided centrally of the forward ring 14, as indicated by a broken line in FIG. 5, is formed into a substantially hexagonal shape provided by arcuately cutting away the four corners of a rectangle long in the direction of the X—X axis (the direction of the longer side of a film opening 1B) and somewhat short in the direction of the Y—Y axis (the direction of the shorter side of the film opening), with the optic axis as the center.

Figure 5:
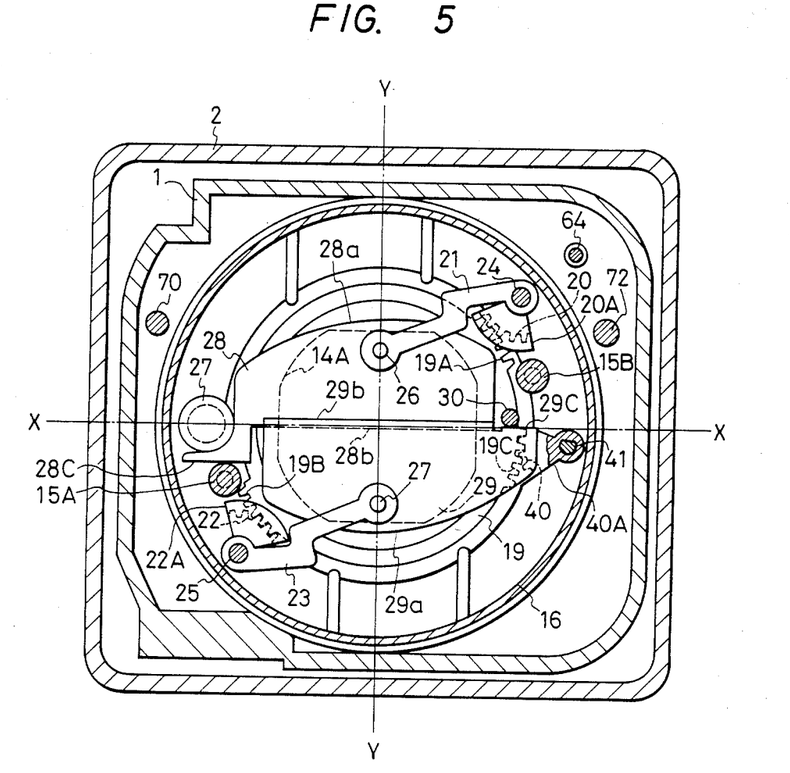
FIG. 5 is a cross-sectional view taken along line B—B of FIG. 1.

A ring gear 19 is rotatably supported on the back of the forward ring 14, and as shown in FIG. 5, on the ring gear 19, a first segment gear portion 19A and a second segment gear portion 19B are formed symmetrically about the optic axis at positions spaced apart from each other by 180°.

Further, a third segment gear portion 19C having a tooth form outer periphery somewhat smaller than the tooth form outer peripheries of the pair of segment gear portions 19A and 19B is formed on the outer periphery of the ring gear near the first segment gear portion 19A. A first pinion gear 20 meshing with the first segment gear portion 19A is formed integrally with a first pivotable lever 21, and a flange portion 20A is integrally formed on one side of the tooth row thereof. A second pinion gear 22 meshing with the second segment gear portion 19B is formed integrally with a second pivotable lever 23, and a flange portion 22A is integrally formed on one side of the tooth row thereof. The first pivotable lever 21 and the second pivotable lever 23 have their respective base portions formed into the shape of a key so that they can be plastic-molded integrally with the first pinion gear 20 and the second pinion gear 22, respectively. The first pinion gear 20 and the first pivotable lever 21 formed integrally with each other and the second pinion gear 22 and the second pivotable lever 23 formed integrally with each other are rotatably supported between the barrier blade base plate 9 and the forward ring 14 through support shafts 24 and 25, respectively, and further, the ring gear 19 is prevented from moving in the thrust direction (the rightward direction as viewed in FIG. 1) by flange portions 20A and 22A. The first barrier blade 28 and the second barrier blade 29 are rotatably held on the free ends of the first pivotable lever 21 and the second pivotable lever 23 through pin shafts 26 and 27, respectively. The first and second barrier blades 28 and 29 have outer edge portions 28a and 29a presenting an arcuate shape of a radius substantially equal to the radius of the inner periphery of the outer shell 16, and when the lens barrier blades 28 and 29 are opened, the outer edge portions 28a and 29a come into contact with the inner peripheral surface of the outer shell 16 and at that time, straight chord portions (opening end edge portions) 28b and 29b opposite to the outer edge portions 28a and 29a become parallel to the direction of the longer side of the film opening 1B (the direction of the X—X axis). When the lens barrier blades 28 and 29 are closed, the chord portions 28b and 29b contact each other on the optic axis as shown in FIG. 5, and at that time, the lower end 28C of the first barrier blade 28 bears against the strut 15A and the upper edge of the right end of the second barrier blade 29 bears against a limit pin 30 studded in the barrier blade base plate 9 so that the direction of the chord portions 28b and 29b is the same X—X axis direction as that during opening.

Figure 4:
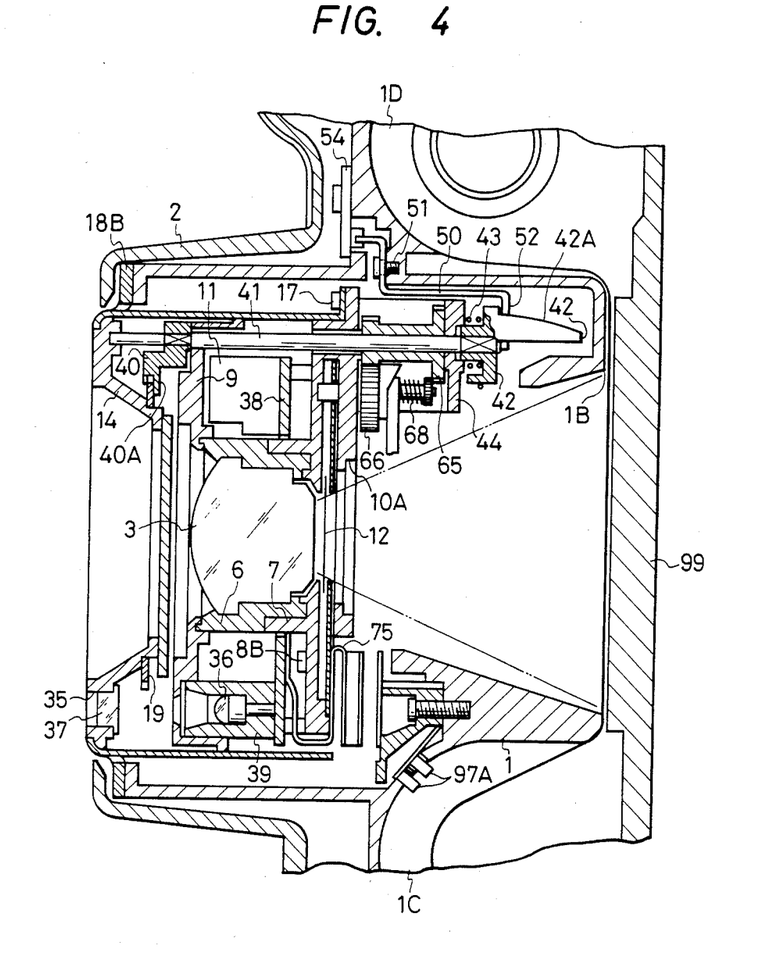
FIG. 4 is a cross-sectional view taken along line A—A of FIG. 1.

Further, an exposure meter light-receiving window 35 is provided in the forward ring 14, as shown in FIG. 4, and a light-receiving element 36 is provided rearwardly (rightwardly as viewed in FIG. 4) of the exposure meter light-receiving window 35. The light-receiving window 35 is sealed by a dust-proof transparent plastic plate 37. The light-receiving element 36, as shown in FIG. 4, is contained in a light-receiving element holder 39 provided on a shutter blade control circuit substrate 38 provided between the barrier blade base plate 9 and the shutter blade base plate 7. The shutter blade control circuit substrate 38 is secured onto the shutter blade base plate 7 with a suitable gap therebetween, and on the shutter blade control circuit substrate 38, there are provided, in addition to the light-receiving element holder 39, a step motor 11 to be described for driving the shutter blade 12 serving also as a diaphragm, and a control circuit device including transistors $Tr_1$ and $Tr_2$ for controlling the step motor, a photometering IC 95 to be described and capacitors $C_1$ and $C_2$, in surrounding relationship with the main lens frame 6. See FIG. 6.

A third pinion gear 40 meshing with the third segment gear portion 19C of the ring gear 19 is supported on an interlocking shaft 41 and formed integrally with a flange portion 40A, as shown in FIG. 4. The flange portion 40A, together with the flange portion 20A of the first pinion gear 20 and the flange portion 22A of the second pinion gear 22, is designed so as to prevent movement of the ring gear 19 in the thrust direction (the rightward direction as viewed in FIG. 4). The interlocking shaft 41 supporting the third pinion gear 40 is rotatably supported on a bracket 44 secured to the back of the bed plate 10, and one end thereof is rotatably supported on the forward ring 14 as shown in FIG. 4. The other end of the interlocking shaft 41 extends through the bracket 44 and integrally supports a cam member 42 on the back of the bracket as shown in FIGS. 4 and 7. The cam member 42 has a cam surface 42A inclined with respect to the direction of movement of the bed plate 10 and is biased by a torsion coil spring 43 so as to rotate counter-clockwise as viewed in FIG. 7. The rotation is limited when the lens barrier blades 28 and 29 are opened and bear against the inner surface of the outer shell 16 and when the lens barrier blades 28 and 29 are closed and come into contact with each other.

A sliding plate 50 for rotating the cam member 42 is provided so as to be guided by a guide pin 51 studded in the camera body 1 and be slidable vertically as viewed in FIG. 7. One end of the sliding plate 50 is formed with a bent engaging projection 52 which, as shown in FIG. 7, is engageable with the cam surface 42A of the cam member 42 when the bed plate 10 is moved inwardly as shown in FIG. 1. The sliding plate 50 is operatively associated with the focal length selecting member 5 through an interlocking plate 54 biased upwardly as viewed in FIG. 7 by a tension coil spring 53 and a cam plate 56 engaged with a sliding pin 55 studded in the interlocking plate 54. An upper edge 56B and a lower edge 56C having a level difference in the vertical direction on the opposite sides of a cam surface 56A as shown in FIG. 7 are formed on the cam plate 56, and when the index mark 5A of the focal length selecting member 5 points to the telephoto symbol "T" and the wide angle symbol "W", the lower edge 56C comes into engagement with the sliding pin 55 and the engaging projection 52 of the sliding plate 50 is placed outside the track of the cam surface 42A of the cam member 42 along the optic axis, but when the focal length selecting member 5 is moved rightwardly and downwardly as viewed in FIG. 7 so that the index mark 5A points to the symbol "OFF", the sliding pin 55 is moved upwardly along the cam surface 56a by the biasing force of the tension coil spring 53 and comes into engagement with the upper edge 56B. This upward movement of the sliding pin 55 causes upward movement of the engaging projection 52 of the sliding plate 50, and the engaging projection 52 comes into engagement with the cam surface 52A of the cam member 42, thereby rotating the interlocking shaft 41, together with the cam member 42, clockwise as viewed in FIG. 7 against the biasing force of the torsion coil spring 43.

The reversible motor M for driving and displacing the bed plate 10 and the sub lens holder 13 is controlled through a motor control circuit 59 operated on the basis of the signals from switch device 57 operatively associated with the focal length selecting member 5 and a distance detecting device 58 for automatic focus adjustment provided in the camera body 1. In this case, the motor drive for focus adjustment is started by depression of a release button, not shown. However, changeover of the focal length is accomplished by the motor drive by the operation of the focal length selecting member 5 independently of the depression of the release button. At that time, the bed plate 10 is moved outwardly beyond the close distance position in the wide angle state or moved inwardly beyond the infinity position in the telephoto state, by the change-over signal of the switch device 57, and in the meantime, the sub optical system 4 is inserted onto or retracted from the optic axis.

Figure 8:
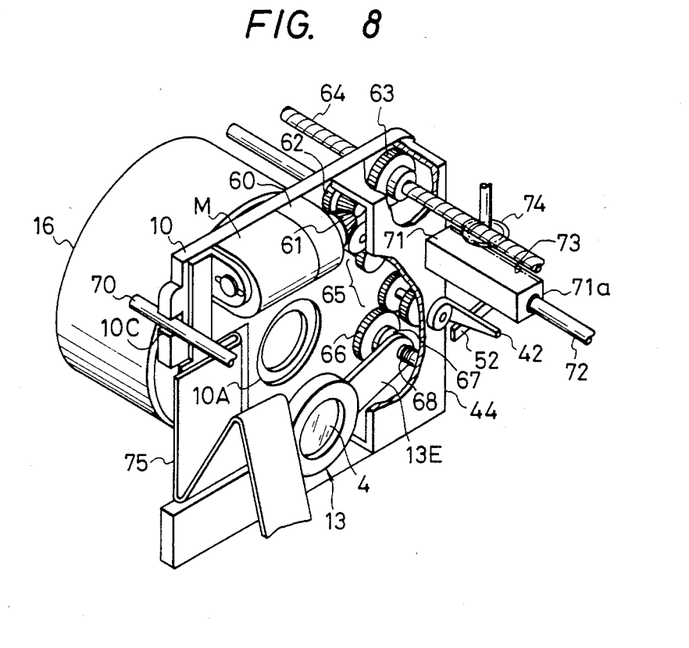
FIG. 8 is a perspective view showing an optical system moving device portion provided on the back of the bed plate of FIG. 1.

FIG. 8 is a perspective view of the bed plate 10 as seen from the back side thereof to show a driving mechanism for driving the bed plate 10 and the sub lens holder 13. The reversible motor M is secured to the upper portion of the back of the bed plate 10, and the revolution thereof is transmitted through the bevel gear 61 of a reduction gear head 60 to a spur gear 62 integral with another bevel gear. A driving gear 63 meshing with the spur gear 62 is rotatably supported on the bed plate 10, and a feed screw shaft 64 secured to the fixed portion of the camera body 1 and extending in the direction of the optic axis is threadably engaged with a female lead screw provided centrally of the bed plate. Rotation of the spur gear 62 is transmitted through a reduction gear train 65 to a cam gear 66. A front cam 67 (see FIG. 2) is provided on the surface of the cam gear 66, and the handle portion 13E of the sub lens holder 13 is biased by a compression coil spring 68 so as to be urged against the front cam 67. When the front cam 67 is rotated in response to revolution of the reversible motor M for the change-over of the focal length, the sub lens holder 13 is displaced rightwardly along the optic axis as viewed in FIG. 1 in conformity with the cam shape of the front cam 67, and subsequently is rotated clockwise about the cam gear 66 as viewed in FIG. 8. When the sub optical system 4 is moved on the photo-taking optic axis, the sub lens holder 13 is displaced leftwardly along the optic axis and the inner frame shell 13B (see FIG. 3) of the sub lens holder 13 is inserted into the circular stepped portion 10A of the bed plate 10 as shown in FIG. 2, whereby the sub optical system 4 is fixed on the optic axis.

In FIG. 8, a cut-away groove 10C is provided in the left side (the right side as viewed in FIG. 6) of the bed plate 10, and a first guide shaft 70 secured to the fixed portion of the camera body 1 and elongated in the direction of the optic axis is fitted in the cut-away groove 10C so that the bed plate is not rotated about the feed screw shaft 64 when the driving gear 63 is rotated. An interlocking strut 71 extending in the axial direction as shown in FIG. 8 is projectedly provided on the bracket 44 secured to the back of the bed plate 10, and a second guide shaft 72 secured to the fixed portion of the camera body 1 and extending in the direction of the optic axis extends through a through-hole 71a formed in the end surface of the interlocking strut 71 and a through-hole 10b (see FIG. 6) formed in the bed plate 10. The bed plate 10 is held perpendicularly to the photo-taking optic axis by the interlocking strut 71 and the second guide shaft 72 and is moved back and forth along the optic axis in response to revolution of the reversible motor M. A rack 73 is provided on a side of the interlocking strut 71, and a pinion 74 meshing with the rack 73 is operatively associated with a photographing distance display device, a distance detecting device and a finder magnification changing mechanism, all being not shown.

The bed plate 10 moved in the direction of the optic axis and the camera body 1 are bridged by a flexible printed substrate 75 bent in a wave form as shown in FIGS. 4 and 8. The reversible motor M on the bed plate 10, the step motor 11 on the shutter blade control circuit substrate 38 and the exposure meter light-receiving element 36 are connected to electrical devices such as a focus detecting circuit device and an exposure value operating circuit device on the camera body 1 side through the flexible printed substrate 75.

Figure 9:
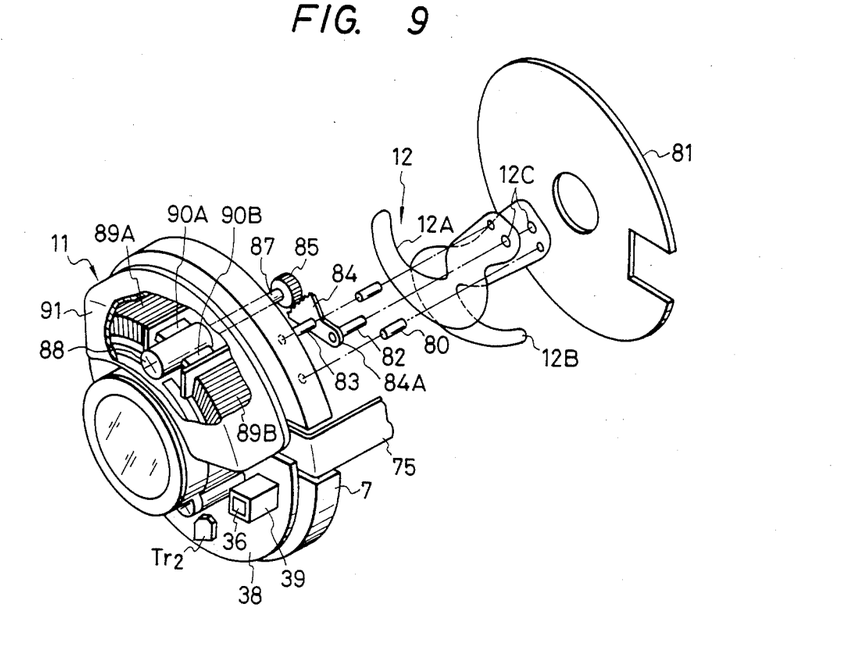
FIG. 9 is a perspective view of the shutter blade driving portion in FIG. 1.

FIG. 9 is a perspective view showing the construction of a shutter blade serving also as a diaphragm and a driving portion therefor. The shutter blade 12 serving also as a diaphragm is comprised of two diaphragm blades 12A and 12B which are rotatably supported by two pins 80 studded in the back of the shutter blade base plate 7. Also, a blade keeper plate 81 is secured to the shutter blade base plate 7 with a slight gap with respect to the back of the shutter blade base plate 7, as shown in FIG. 1. A driving pin 82 extending through elliptical holes 12C formed in the respective diaphragm blades 12A and 12B is studded in the arm 84A of a sector gear 84 rotatably supported on a pin shaft 83 secured to the shutter blade base plate 7, and when the driving pin 82 is rotated clockwise about the pin shaft 83 as viewed in FIG. 9, the shutter blade 12 may be opened up to an aperture diameter corresponding to the angle of rotation of the driving pin. A pinion 85 meshing with the sector gear 84 is supported on one end of a rotary shaft 87 extending through the shutter blade base plate 7 and the shutter blade control circuit substrate 38, and the rotor 88 of the step motor 11 is provided on the other end of the rotary shaft 87.

The step motor 11 comprises the rotor 88 (a permanent magnet type magnetized to provide four poles), a pair of stators 90A and 90B on which coils 89A and 89B are wound, and a motor cover 91 enclosing these, the pair of stators 90A and 90B being disposed symmetrically about the rotor 88 as shown in FIG. 6. The motor cover 91 enclosing them is of a substantially semicircular shape and is disposed around the main lens frame 6. The step motor 11, as shown in FIG. 2, is installed at a position on the shutter blade control circuit substrate 38 which is opposed to the first barrier blade 28 when the lens barrier blades are opened at the opposite sides of the barrier blade base plate 9, and the transistors Tr$_1$, Tr$_2$, the photometering IC 95, etc. are disposed at positions on the shutter blade control circuit substrate 38 which are opposed to the second barrier blade 29 when opened.

Figure 10:
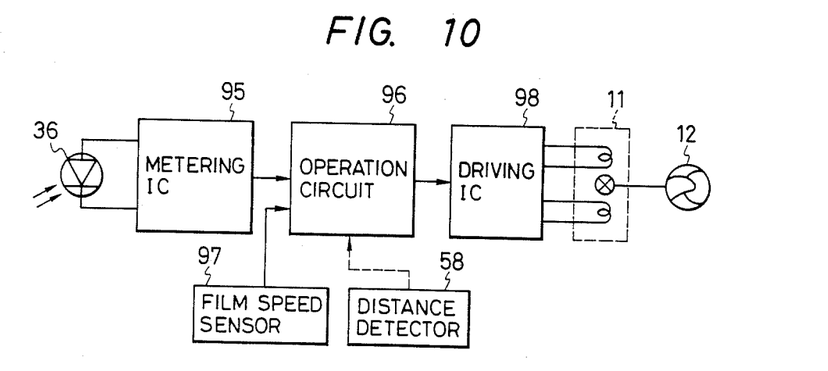
FIG. 10 is a block diagram of a control circuit for the shutter blade serving also as a diaphragm in the embodiment of FIG. 1.

FIG. 10 is a block diagram of an electrical system for operating the step motor 11. The brightness of an object to be photographed detected by the light-receiving element 36 such as a silicon photodiode (SPD) is digitalized by the photometering IC 95 and supplied to an operation circuit 96. The digitalized film speed value signal from a film speed sensor 97 which detects codes indicative of the type of film and the film speed value provided on the film magazine is also supplied to and stored in the operation circuit 96. From the object brightness signal and the film speed value signal, an aperture value and a shutter blade speed value based on a predetermined program are calculated in the operation circuit, and the calculated exposure value is supplied to a driving IC 98. The step motor 11 is controlled by a pulse signal from the driving IC 98, and the shutter blade serving also as a diaphragm is operated as a program shutter blade opened and closed in accordance with a predetermined combination of the calculated aperture value and shutter blade speed value. In this case, the directions of magnetization of the stators 90A and 90B of the step motor 11 can be alternately changed to move the magnetic field, thereby rotating the rotor 88 in a forward direction or a reverse direction.

A contactor 97A for detecting film information codes such as the film speed value, etc. provided on the surface of the film magazine is projectedly provided on a side wall of the film magazine chamber 1C of the camera body 1, as shown in FIG. 4. Of the detection signals detected by this contactor 97A, the film speed value signal is digitalized by film speed detecting device 97 and supplied to the operation circuit 96 (see FIG. 10) provided on the camera body 1 side. Also, the pulse signal from the driving IC 98 for controlling the step motor 11 is transmitted from the camera body 1 side to the step motor 11 through the flexible printed substrate 75. Further, the magazine chamber 1C, a film take-up chamber 1D and film aperture 1B are hermetically sealed by a conventional back lid 99 as shown in FIGS. 1 and 3, and the contactor 97A is provided so as to be urged against the film information code portion when the film magazine, not shown, is pressed by the closing operation of the back lid 99 when the film magazine is inserted.

The operation and action of the embodiment constructed as described above will now be described.

In the state as shown in FIGS. 1 and 5 wherein the lens barrier blades 28 and 29 are closed, the bed plate 10 is moved inwardly and the outer shell 16 is contained substantially fully in the outer case 2 of the camera body side. In this embodiment, the outer shell 16 containing therein the lens barrier blades 28, 29, the main optical system 3 and the shutter blade driving step motor 11 is formed with a circular cross-section and therefore, any light entering from the gap between the outer shell 16 and the camera body 1 into the interior of the camera is easily and completely intercepted by the dual light-intercepting member 18B provided in the forward end portion of the camera body 1, and the light will never enter the interior of the camera even if the outer shell 16, together with the main optical system 3, is greatly extended in the direction of the optic axis as shown in FIG. 2.

Also, in the state as shown in FIG. 1 wherein the lens barrier blades 28 and 29 are closed, the focal length selecting member 5 (see FIG. 7) is in a position wherein the index mark 5A registers with the symbol "OFF" (hereinafter referred to as the "OFF position"), the sliding pin 55 is engaged with the upper edge 56B of the cam plate 56, and the engaging projection 52 of the sliding plate 50 is engaged with the base plate of the cam surface 42A of the cam member 42 secured to one end of the interlocking shaft 41 operatively associated with the lens barrier blades 28 and 29, as shown in FIG. 4. The sub optical system 4 is placed at a position retracted from the phototaking optic axis, as shown in FIGS. 1 and 8.

Figure 11:
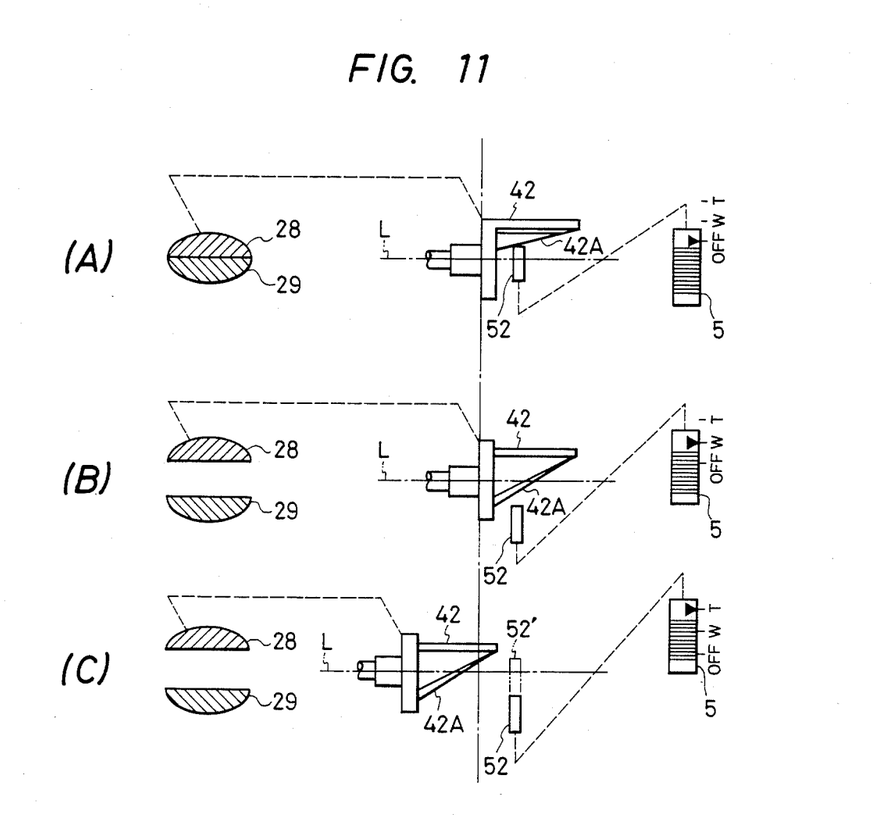
FIG. 11 illustrates the operation of the lens barrier blade opening-closing device shown in FIG. 7, FIGS. 11(A), (B) and (C) showing the states in which a focal length selecting number is in the OFF position, the wide angle position and the telephoto position, respectively.

FIG. 11 illustrates the operative association among the focal length selecting member 5, the engaging projection 52, the cam member 42 and the lens barrier blades 28,29. FIG. 11(A) shows a state in which the focal length selecting member is in the OFF position, and FIGS. 11(B) and (C) shows states in which the focal length selecting member 5 has been moved to the wide angle position and the telephoto position, respectively. The operations of the interlocking mechanism of the lens barrier blades 28 and 29 and the driving mechanism of the photo-taking lens optical system will hereinafter be described with reference to FIG. 11.

In FIG. 11, when the focal length selecting member 5 is in the OFF position, the lens barrier blades 28 and 29 are closed as shown in (A). When the focal length selecting member 5 is moved from this state to the wide angle position (the position indicative of the symbol "W"), the cam plate 56 moves to the left as viewed in FIG. 7 and therefore, the sliding pin 55 moves downwardly along the cam surface 56A and comes into engagement with the lower edge 56C. By this downward movement of the sliding pin 55, the interlocking plate 54 slides downwardly against the biasing force of the tension coil spring 53, and the sliding plate 50 operatively associated therewith moves downwardly as viewed in FIG. 7. Accordingly, the engaging projection 52 urged against the cam surface 42A of the cam member 42 retracts downwardly as shown in FIG. 11(B). In response to this downward displacement of the engaging projection 52, the cam member 42 is rotated counter-clockwise as viewed in FIG. 7 by the biasing force of the torsion coil spring 43 (see FIG. 7). This rotation of the cam member 42 is transmitted to the third pinion gear 40 through the interlocking shaft 41, whereby the third pinion gear 40 is rotated counter-clockwise as viewed in FIG. 7 (clockwise as viewed in FIG. 5).

By this rotation of the third pinion gear 40, the ring gear 19 is rotated clockwise about the optic axis as viewed in FIG. 7 (counter-clockwise as viewed in FIG. 5). By this rotation of the ring gear 19, the first pinion gear 20 and the second pinion gear 22 are both rotated counter-clockwise as viewed in FIG. 7 (clockwise as viewed in FIG. 5) and therefore, the first barrier blade 28 and the second barrier blade 29 rotatably coupled to the free ends, respectively, of the first pivotable lever 21 integral with the first pinion gear 20 and the second pivotable lever 23 integral with the second pinion gear 22 are displaced in opposite directions, and are stopped at positions whereat the outer edge portions 28a and 29a (see FIG. 5) of the respective outer peripheries bear against the inner peripheral surface of the outer shell 16 as shown in FIG. 2. Thereby, the lens barrier blades 28 and 29 are opened to assume the state shown in FIG. 11(B).

When the focal length selecting member 5 is moved from the OFF position to the wide angle (W) position, a wide angle code signal for placing the photo-taking lens into the wide angle state is supplied from the switch device 57 (see FIG. 7) operatively associated with the focal length selecting member 5 to the motor control circuit 59 for controlling the reversible motor M. So, the motor control circuit 59 drivingly controls the reversible motor M, slightly moves the main optical system 3 outwardly with the bed plate 10, and stops the reversible motor M when the main optical system 3 has been displaced to the infinity position in the wide angle state. At that time, the infinity position of the bed plate 10 in the wide angle state is determined by a distance signal transmitted from an encoder (not shown) operatively associated with the rotation of the pinion 74 meshing with the rack 73 (see FIG. 8) of the interlocking strut 71 movable with the bed plate 10.

Next, photography in the wide angle state is accomplished by depressing a release button, not shown. By this depression of the release button, infrared light is projected from the distance detecting device 58 toward the object to be photographed and at the same time, the reversible motor M is revolved by the signal from the motor control circuit 59. The revolution of the reversible motor M is transmitted to the driving gear 63 through the bevel gear 61 and the spur gear 62 shown in FIG. 8, whereby the driving gear 63 is rotated counter-clockwise to move the bed plate 10 leftwardly in accordance with the lead of the feed screw shaft 64. At that time, the bed plate 10 is guided and moved along the optic axis by the guide shafts 70 and 72. Further, the distance detecting device 58 (see FIG. 7) receives the reflected light of the spot projected upon the object to be photographed and detects the position of the object to be photographed, and supplies a detection signal to the motor control circuit 59 to thereby stop the reversible motor at that position, whereupon the distance adjustment of the main optical system 3 is completed. This distance detecting device 58 is similar to one generally known and the construction thereof need not be described. The cam gear 66 rotated through the reduction gear train 65 slightly rotates clockwise as viewed in FIG. 8 with the rotation of the spur gear 62 during distance adjustment, but the sub lens holder 13 is maintained immovable in the retracted position because the arm 13E of the sub lens holder 13 is in engagement with the uninclined flat surface of the front cam 67.

As described above, the movement of the main optical system 3 in the direction of the optic axis for distance adjustment (focus adjustment) is accomplished by the bed plate 10 being moved in the direction of the optic axis in response to the rotation of the driving gear 63 provided on the bed plate 10. For this reason, a distance adjusting helicoid screw mechanism such as on an ordinary photo-taking lens is not provided around the main optical system 3, and the outer diameter of the main lens frame 6 holding the main optical system 3 is made much smaller than that of a conventional two-focus type camera photo-taking lens barrel. However, the inner diameter of the outer shell 16 surrounding it is determined by the outer peripheral diameter of the lens barrier blades 28 and 29 when in their open state and therefore, a relatively large doughnut-shaped spaced is created between the outer shell 16 and the main lens frame 6. The step motor 11, the photometering light-receiving element 36, the photometering IC95, etc. are effectively disposed in this space.

When the automatic distance adjustment in the wide angle state is completed, the step motor 11 starts to operate and opens and closes the shutter blade 12 serving also as a diaphragm. As seen, as the focal length selecting member 5 is moved from the OFF position to the wide angle (W) position, the photometering IC95 and the operation circuit 96 in FIG. 10 start to operate and a detection signal corresponding to the brightness of the object to be photographed is supplied from the light-receiving element 36 to the photometering IC95, where the detection signal is made into a digital code, and the aperture value and the shutter blade speed value corresponding to the brightness of the object to be photographed are determined by the operation circuit 96, and the result is memorized in the operation circuit. This memorized value is automatically modified each time in conformity with the variation in the brightness of the object to be photographed.

When the operation circuit 96 receives the distance detection signal (the reversible motor stopping signal) of the aforementioned distance detecting device 58, the aperture value and shutter blade speed value based on the result of the operation are made into pulses and supplied to the next stage driving IC98. The driving IC98 drivingly controls the step motor 11, and in accordance with the combination of the aperture value and shutter blade speed value based on the result of the operation of the operation circuit 96, the step motor 11 opens the diaphragm blades 12A and 12B from their closed state to a stop aperture corresponding to that aperture value, and returns the diaphragm blades 12A and 12B to their closed state after a delay time corresponding to that shutter blade speed value, thus completing the exposure.

Change-over of the focal length will now be described. When the focal length selecting member 5 is moved to the telephoto (T) position as shown in FIG. 11(C), a telephoto state signal is supplied from the switch device 57 (see FIG. 7) to the motor control circuit 59 in response to that movement, whereby the reversible motor M is resolved and the bed plate 10 is moved to the infinity position in the telephoto state beyond the close distance position in the wide angle state. At that time, the cam gear 66 is greatly rotated clockwise as viewed in FIG. 8, and when the arm 13E of the sub lens holder 13 is pushed upwardly as viewed in FIG. 8 by the inclined cam surface of the front cam 67 against the biasing force of the compression coil spring 68, the sub lens holder 13 is rotated clockwise with the cam gear 66 and the photo-taking optic axis and the optic axis of the sub optical system 3 become coincident with one another, whereupon the sub lens holder 13 is moved leftwardly along the cam surface of the front cam 67 and along the optic axis, and is installed rearwardly of the main optical system 3 with a predetermined interval therefrom as shown in FIG. 2, and the main optical system 3 and the sub optical system 4 are combined and thus, the photo-taking lens assumes a telephoto state of long focal length. The infinity position of the bed plate 10 in the telephoto state is also determined by a distance signal from an encoder (not shown) operatively associated with the pinion gear 74 (FIG. 8).

In the above-described change-over operation to the telephoto state, where the focal length selecting member 5 is moved from the wide angle (W) position shown in FIG. 11(B) to the telephoto (T) position shown in FIG. 11(C), the engaging projection 52 comes out of engagement with the cam surface 42A of the cam member 42 and the lens barrier blades 28 and 29 are already in their open state and therefore, the cam member 42 is not rotated, but is only moved leftwardly with the bed plate 10, as shown in FIG. 11(C). However, when the focal length selecting member 5 is displaced from the OFF position shown in FIG. 11(A) directly to the telephoto (T) position beyond the wide angle (W) position, the cam member 42 is moved leftwardly while being rotated and in response thereto, the lens barrier blades 28 and 29 are fully opened as shown in FIGS. 2 and 7.

In the telephoto state, the outer shell 16 projects long from the fore end of the outer case 2 as shown in FIG. 2. However, since the outer shell 16 is formed into a cylindrical shape and the gap between it and the camera body 1 is sealed by the dual light-intercepting member 18B, the interior of th camera body 1 is maintained in a perfectly light-tight state by a very simple structure. Also, in this case, the outer frame 13C of the sub lens holder 13 is placed in coincidence with the center of the optic axis as shown in FIG. 2 and there is no possibility of this outer frame bearing against the camera body 1. Therefore, in the wide angle state, i.e., in the contained state as shown in FIG. 1, a part of the outer frame 13C may protrude downwardly from the lower end edge of the bed plate 10. Accordingly, the size of the outer shell 6 is determined by the positions of the outer edge portions 28a and 29a when the lens barrier blades 28 and 29 are opened. Therefore, the outer peripheral radius of the outer shell 6 can be set to a small value independently of the sub lens holder 13 when in its retracted position.

When the sub optical system 4 is inserted onto the optic axis of the main optical system 3 as shown in FIG. 2 and the bed plate 10 arrives at the infinity position in the telephoto state, the reversible motor M is stopped. Thereafter, when the release button, not shown, is depressed, distance adjustment is effected in a manner similar to the photography in the wide angle state, and simultaneously with the completion of the distance adjustment, the step motor 11 is operated on the basis of the aperture value and the shutter blade speed value calculated by the operation circuit 96 (see FIG. 10), and the shutter blade 12 serving also as a diaphragm is opened and closed, whereby exposure is accomplished.

When the focal length selecting member 5 is changed over from the telephoto (T) position to the wide angle (W) position, the reversible motor M is revolved in a reverse direction and the bed plate 10 is moved inwardly beyond the infinity position in the telephoto state and, when it arrives at the infinity position in the wide angle state, the reversible motor is stopped. In the meantime, the sub lens holder 13 is moved to its retracted position as shown in FIG. 1, and the main optical system 3 returns to the infinity position in the wide angle state. So, when the focal length selecting member 5 is moved to the OFF position, the sliding pin 55 (See FIG. 7) slides on the cam surface 50A of the cam plate 56 and is moved upwardly as viewed in FIG. 7 by the biasing force of the tension coil spring 53, and becomes engaged with the upper edge 56B. This upward movement of the sliding pin 55 causes upward movement of the engaging projection 52 which is integral with the sliding plate 50 operatively associated with the sliding pin 55. By its upward movement, the engaging projection 52 comes into engagement with the cam surface 42A of the cam member 42, thereby rotating the cam member 42 as shown in FIG. 11(A) and closing the lens barrier blades 28 and 29. In the meantime, the bed plate 10 is slightly moved inwardly to the barrel containing position beyond the infinity position in the wide angle state and is stopped at that position.

Also, when the focal length selecting member 5 is moved from the telephoto (T) position directly to the OFF position, the bed plate 10 is returned to the barrel containing position, but at the initial stage of the return, the engaging projection 52 is inserted (indicated by broken line 52') onto the track L of the cam member 42 in the direction of the optic axis as shown in FIG. 11(C). Therefore, when the bed plate 10 is moved inwardly and the cam member 42 is moved rightwardly as viewed in FIG. 11(C), the cam surface 52A comes into engagement with the engaging projection 52 moved to the broken line (52') position, and as the cam member 42 is further moved rightwardly, the cam surface 42A is pushed by the engaging projection and thus, the cam member 42 is rotated clockwise as viewed in FIG. 7. Thereby, the lens barrier blades 28 and 29 are automatically closed.

While the above-described embodiment is a two-focus camera, the present invention is not restricted thereto, but is applicable to any camera in which the photo-taking lens barrel is displaceable in the direction of the optic axis.

In the above-described embodiment, the step motor 11 is used as the shutter blade driving device for driving the shutter blade 12 serving also as a diaphragm, but this is not restrictive and use may be made of an ordinary compact reversible motor or a magnet.

According to the present invention, as described above, the shutter blade driving device for driving the shutter blade serving also as a diagram is disposed in the annular space defined by the outer peripheral surface of the photo-taking optical system, the outer shell and the lens barrier blades in their opened position, and this leads to a very good space efficiency and compactness of the camera. Further, according to the preferred embodiment, even if the amount of movement of the photo-taking lens barrel is great and correspondingly the amount of protrusion of the outer shell from the camera body becomes great, light-interception between the outer shell and the camera body can be ensured by a simple construction to eliminate the possibility of light entering the interior of the camera body because the outer shell surrounding the shutter blade driving device and the lens barrier blades is formed into a cylindrical shape of a circular cross-section orthogonal to the optic axis. Furthermore, according to the preferred embodiment, the optical system moving mechanism provided on the back side of the bed plate, the shutter blade serving also as a diaphragm provided on the shutter blade base plate and the driving device therefor, and the lens barrier device supported by the barrier blade base plate and the forward ring are all made into units and may be stacked and coupled together after they have been partly assembled, and this facilitates assembly. Also, as regards the operation of the photo-taking lens barrel side including the bed plate, all parts are electrically connected together through the foldable type flexible printed substrate except the mechanical operative association between the barrier blade opening-closing cam member when contained and the focal length selecting member of the camera body side and thus, assembly is easy and moreover, the camera can be made high in reliability.

I claim:

1. A camera having a photo-taking lens barrel displaceable in the direction of an optic axis, said lens barrel including:
    a photo-taking optical system having said optic axis;
    a lens barrier blade member disposed forwardly of said optical system and movable in a lane orthogonal to said optic axis between a closed position for covering the front of said optical system and an opened position for exposing the front of said optical system;
    a shutter blade member serving also as a diaphragm, said shutter blade member being disposed rearwardly of said optical system and opened and closed to expose a film to light;
    an outer shell member surrounding said optical system, said barrier blade member and said shutter blade member; and
    a shutter blade driving device disposed in a space rearward of said barrier blade member when in said opened position and surrounding said optical system, said driving device driving said shutter blade member;
    said barrier blade member having an outer edge portion adapted to bear against an inner peripheral surface of said outer shell member when said barrier blade member is in said opened position.

2. A camera according to claim 1, wherein said outer shell member is of a cylindrical shape.

3. A camera according to claim 2, wherein said outer edge portion of said barrier blade member is arcuate.

4. A camera according to claim 1, wherein said shutter blade driving device includes a step motor having a rotor having a plurality of magnetic poles and a stator disposed substantially semicircularly around said optical system.

5. A camera having a photo-taking lens barrel displaceable in the direction of an optic axis, said lens barrel including:
    a photo-taking optical system having said optic axis;
    a lens barrier blade member disposed forwardly of said optical system and movable in a plane orthogonal to said optic axis between a closed position for covering the front of said optical system and an opened position for exposing the front of said optical system; and
    an outer shell member surrounding said optical system and said barrier blade member;
    said barrier blade member having an outer edge portion adapted to bear against an inner peripheral surface of said outer shell member when said barrier blade member is in said opened position.

6. A camera according to claim 5, wherein said outer shell member is of a cylindrical shape.

7. A camera comprising:
    a camera body member;
    a photo-taking optical system having an optic axis;
    lens barrier means having a barrier blade member disposed forwardly of said optical system and movable between a closed position for covering the front of said optical system and an opened position for exposing the front of said optical system;
    a shutter device having a shutter blade member opened and closed to expose a film to light, and means for driving said shutter blade member;
    an outer shell member formed in a cylindrical shape and holding said optical system, said lens barrier means and said shutter device, said outer shell member having first and second end openings through which said optic axis passes and surrounding said optical system, said lens barrier means and said shutter device; and
    means for moving said outer shell member along said optic axis relative to said camera body member, whereby said optical system, said lens barrier means and said shutter device are movable with said outer shell member.

8. A camera according to claim 7, wherein said barrier blade member is arranged on a first plane positioned between said first end opening and said optical system and orthogonal to said optic axis, and said shutter blade member is arranged on a second plane positioned between said optical system and said second end opening and orthogonal to said optic axis.

9. A camera according to claim 8, wherein said driving means of said shutter device is disposed in a space between said outer shell member, said optical system, said first plane and said second plane.

10. A camera according to claim 8, wherein said lens barrier means further has means for displacing said barrier blade member along said first plane.

11. A camera according to claim 10, wherein said moving means moves said outer shell member between a retracted position wherein said outer shell member is substantially contained in said camera body member and a projected position wherein said outer shell member is outwardly projected from said camera body member, and said displacing means displaces said barrier blade member to said opened position when said outer shell member is in said projected position.

12. A camera according to claim 11, wherein said displacing means displaces said barrier blade member to said closed position when said outer shell member is in said retracted position, and said camera further comprises means operable to disable said displacing means when said outer shell member is in said retracted position.

* * * * *